United States Patent
Braun et al.

[11] Patent Number: 6,133,944
[45] Date of Patent: *Oct. 17, 2000

[54] HEAD MOUNTED DISPLAYS LINKED TO NETWORKED ELECTRONIC PANNING CAMERAS

[75] Inventors: David Alan Braun, Denville; Lanny Starkes Smoot, Morris Township, Morris County, both of N.J.

[73] Assignee: Telcordia Technologies, Inc., Morristown, N.J.

[*] Notice: This patent is subject to a terminal disclaimer.

[21] Appl. No.: 08/767,752

[22] Filed: Dec. 17, 1996

Related U.S. Application Data

[60] Provisional application No. 60/008,822, Dec. 18, 1995.
[51] Int. Cl.[7] .................................................. H04N 7/00
[52] U.S. Cl. .............................. 348/39; 345/31; 345/121; 358/148; 358/149; 358/126; 358/104; 358/250; 358/87
[58] Field of Search .............................. 348/39, 36, 155, 348/565; 345/1, 2, 8

[56] References Cited

U.S. PATENT DOCUMENTS

| | | | |
|---|---|---|---|
| 3,932,702 | 1/1976 | Shelley et al. . | |
| 3,984,633 | 10/1976 | Rutt et al. | 178/69.5 |
| 4,124,865 | 11/1978 | Zwirn | 358/126 |
| 4,373,794 | 2/1983 | Holman | 354/122 |
| 4,670,786 | 6/1987 | Ricciardi | 358/149 |
| 4,688,906 | 8/1987 | Hilbert et al. | 350/462 |
| 5,130,794 | 7/1992 | Ritchey . | |
| 5,153,716 | 10/1992 | Smith . | |
| 5,430,494 | 7/1995 | Saeger et al. | 348/565 |
| 5,444,478 | 8/1995 | Lelong et al. . | |
| 5,473,368 | 12/1995 | Hart | 348/155 |
| 5,532,737 | 7/1996 | Braun | 348/36 |
| 5,604,631 | 2/1997 | Gelardi et al. | 359/412 |
| 5,619,255 | 4/1997 | Booth | 348/36 |
| 5,703,604 | 12/1997 | McCutchen | 348/36 |
| 5,737,012 | 4/1998 | Tabata et al. | 348/53 |

*Primary Examiner*—Christopher S. Kelley
*Assistant Examiner*—Shawn S. An
*Attorney, Agent, or Firm*—Joseph Giordano; James W. Falk

[57] ABSTRACT

A system (300) for combining a panning camera (308) with one or more displays (304), such as head-mounted displays, is provided. A panoramic view from an electronic panning camera may be provided to an electronic panning control circuit (510). The electronic panning control circuit may be responsive to a view selector (306), such as a head-tracker located on a user's HMD. The electronic panning circuit selects the desired portion of the panoramic view to send to the user's display. A stereoscopic, view providing for a depth-of-field effect simulating actual vision, stereo view is achieved by locating a first electronic panning camera (502) in an optically horizontally offset relation with a second electronic panning camera (504). An image splitter (510), such as a half silvered mirror, sends the same, slightly horizontally offset, to both cameras. Individually pannable views may be delivered to users via a communications network (312). One or more electronic panning cameras may output stereoscopic views to a communications network using high bandwidth lines (because the electronic panning cameras typically output a signal having a bandwidth equivalent to several video signals). The panoramic views may be received by local central offices (806) which include electronic panning circuits responsive to users' HMDs. The desired portions of the stereoscopic view may be extracted and sent to the user via conventional video bandwidth lines (because the selected views are typically equivalent to one or two video signals).

4 Claims, 5 Drawing Sheets

HEAD MOUNTED DISPLAYS LINKED TO NETWORKED ELECTRONIC PANNING CAMERAS

RELATED PROVISIONAL APPLICATION AND RELATED APPLICATIONS

This application claims the benefit of U.S. Provisional Application Serial No. 60/008,822 filed on Dec. 18, 1995 and entitled "Head-Mounted Displays Linked to Networked Electronic Panning Cameras." This provisional application names as an inventor one of the inventors named and discloses subject matter claimed herein. The content of this provisional application is incorporated herein by reference.

The following U.S. patents and patent application include subject matter related to the present invention:

(1) U.S. Pat. No. 5,187,571, entitled "Television System for Displaying Multiple Views of a Remote Location", which issued on Feb. 16, 1993 to D. A. Braun, W. A. E. Nilson, III, T. J. Nelson, and L. S. Smoot and assigned to the assignee herein;

(2) U.S. Pat. No. 5,532,737, entitled "Camera Arrangement With Wide Field of View", which issued on Jul. 2, 1996 to D. A. Braun and assigned to the assignee herein; and (3) Provisional Patent Application Serial No. 60/008,821, filed on Dec. 18, 1995 and related U.S. patent application Ser. No. 08/767,751, entitled "Flat Virtual Displays For Telepresence and Virtual Reality", filed concurrently herewith, invented by L. S. Smoot, now U.S. Pat. No. 5,883,606 which issued on Mar. 16, 1999 and assigned to the assignee herein.

The contents of the foregoing documents are incorporated herein by reference.

BACKGROUND OF THE INVENTION

1. Field of the Invention

The present invention relates to virtual reality (VR) and, more particularly head-mounted displays (HMD), to one or arrangement may provide a "stereo" view simulating actual vision. A preferred embodiment of the present invention uses an electronic panning camera, and multiple users may be connected to a single camera and each user may individually control the portion of the scene that the user views without affecting the view of other users.

2. Discussion of Related Art

Researchers in video communications technologies continue to seek ways to provide a person with a greater sense of "being there" via networked communications. Two well known examples of providing this sense are (1) teleconferencing—which provides face-to-face communications between persons at remote locations—and (2) virtual reality—which provides a person with the feeling of actually being at a particular (real or imaginary) location using computer generated simulations.

Technologies aimed at providing network subscribers a high degree of "telepresence"; that is, being able to observe and interact at a remote site, as though physically there, have been pioneered by the assignee of the present invention. For example, the assignee developed the electronic panning camera (described in U.S. Pat. Nos. 5,187,571 and 5,532,737), which provides users with the ability independently (and without affecting the view of other users of the same camera) to pan, zoom, and tilt video images of a remote site gathered by a non-moving camera, and display the images on standard monitors with complete view control.

It is desirable to develop new technologies which allow end-users to immerse themselves in a remote site and look around as though physically there. This may be done by combining the broad look-around capabilities of the electronic panning camera with head-mounted display (HMD) technology, such as is currently used in virtual reality (VR) applications. This combination may allow a user to look around at a remote site over a wide angle simply by moving his/her head.

Prior known VR systems have certain limitations. FIG. 1 illustrates a conventional virtual reality system 100. Here, a user 102 wears a head-mounted display 104 having a head position tracking device 106. The tracking device and HMD are connected to a VR rendering engine 108.

An HMD 104 typically comprises two small video displays (one for each eye) and an optical system which allows the eyes to focus on the screens at close range (typically an inch or so). Because the lens system produces a carefully placed virtual image for each eye, the user appears to see a large image, several feet in front of the user which subtends a fairly large portion of the user's visual field. Typical HMDs 104 provide a field of view between 30° to 60° or more.

Coupled with the HMD 104 is the head-tracking system 106, which reports the head position (and thus the gaze direction) of the user to the VR rendering engine 108. The head position data is delivered to the rendering engine 108 (which may be a high-speed graphics computer) which contains an image data-base. The head position of the user corresponds to the portion of the image the user wishes to see. Thus, the desired portion of a computer-generated scene is determined by the head-tracker device output and the appropriate portion of the scene is rapidly called up from the rendering engine's 108 database. This portion of the scene is displayed for each of the user's eyes. Thus, if the user looks to the left or right, the appropriate image is presented on the displays. The overall effect is that of being located in a surrealistic computer generated environment with the ability to freely look around. As an enhancement to the psychological impact of the effect, the views delivered to each eye are often generated as stereo-pairs having the proper binocular disparity to allow the viewer to see depth in the imagery. Note that images portrayed in a VR system are not real-time video images of real world objects, but rather are computer generated approximations of real or fanciful scenes.

Similar techniques, such as full look-around telepresence, have also been used for controlling remote vehicles, or operating machinery in dangerous or inaccessible locations such as in mines or in outer-space. FIG. 2 illustrates a set-up 200 for such a technique. As seen in FIG. 2, a user 202 wears an HMD 204 with a head tracking system 206. The HMD and head-tracking system are connected to a camera 208 on a panning and tilting stand 210.

In FIG. 2, the user's 202 gaze direction is determined by the head-tracking system 206 and transmitted to a remote location. A television or video camera 208 mounted on a remotely controllable panning and tilting stand 210 moves in a manner synchronized to the user's gaze direction, and transmits images back to the user 202. Stereo viewing may be provided by using two separate cameras 208, 208' (one for each eye view), each connected to a panning and tilting stand 210, 210'.

The effect can be powerful, but is limited in several respects. One important limitation, particularly from a video communications or teleconferencing network provider's perspective, is that the remotely operated camera is a single-user system. That is, only a single user can control the panning and tilting of the camera and look through the viewing system.

Therefore, it is an object of the present invention to provide an apparatus and method for providing a system connecting displays, such as head-mounted displays, to a networked panning camera to permit multiple users to view the same remote scene.

It is yet another object of the present invention to provide an apparatus and method for connecting displays, such as head-mounted displays, to an electronic panning camera to permit multiple users to independently view different views of the same remote scene without interfering with any other viewer's image.

It is an even further object of the present invention to provide an apparatus and method for providing a "stereo" view of a scene being viewed for a depth-of-field effect simulating actual vision.

SUMMARY OF THE INVENTION

These and other objects of the present invention are provided by a system for combining a panning camera with one or more displays, such as head-mounted displays (HMD). In a preferred embodiment, an electronic panning camera is connected to one or more HMDs. Because the electronic panning camera provides panning by allowing any number of users individually to extract a portion of a panoramic view without physically moving the camera, each user may view a desired portion of the viewed scene without affecting the portion of the scene viewed by other users.

In another preferred embodiment, a "stereo" view may be provided for a depth-of-field effect simulating actual vision. This stereo panning is achieved by mounting a first electronic panning camera in an optically horizontally offset relationship with a second electronic panning camera. Using an image splitter, such as a half silvered mirror, the two cameras "share" the view, except for a slight horizontal offset.

In yet another preferred embodiment, a panoramic view from an electronic panning camera is provided to an electronic panning control circuit. The electronic panning control circuit may be responsive to a head-tracker device or gaze-direction sensor located on a user's HMD. In response to the head-tracker device, the electronic panning circuit selects the desired portion of the panoramic view to send to the user's HMD. A number of users may be connected to the electronic panning circuit and each user may individually select a desired view without affecting any other user's view.

In yet a further preferred embodiment, the present invention may deliver video telepresence to a user via a communications network. One or more electronic panning cameras may output panoramic views to a communications network using high bandwidth lines (because the electronic panning cameras typically output a signal having a bandwidth equivalent to several video signals). The panoramic views may be received by local central offices which include electronic panning circuits responsive to users' HMDs. The desired portions of the panoramic view may be extracted and sent to the user via conventional video bandwidth lines (because the selected views are typically equivalent to one or two video signals).

The present invention allows end-users to become immersed in a remote site and look around as though physically there. A preferred embodiment of the present invention unites the broad look-around capabilities of the electronic panning camera with head-mounted display technology borrowed from the field of VR to allow a user to look around at a remote site by simply moving his/her head left or right.

One advantage of the present invention is that it can be accomplished for a virtually unlimited number of independent end-users each receiving imagery over a network from centralized transmission points. Thus, any number of users may view in real-time a live video image, each user independently viewing from a desired angle without affecting other users'views. This capability may be delivered to end-users over various communications networks, including video-dial-tone, SDV (switched digital video), ADSL (asymmetrical digital subscriber line), HFC (hybrid fiber coaxial), and other wideband and broadband access mechanisms.

BRIEF DESCRIPTION OF THE DRAWINGS

The present invention is described with reference to the following figures.

DETAILED DESCRIPTION OF PREFERRED EMBODIMENTS

The present invention is described in the following sections:

Overview of the Invention

Figure 1:
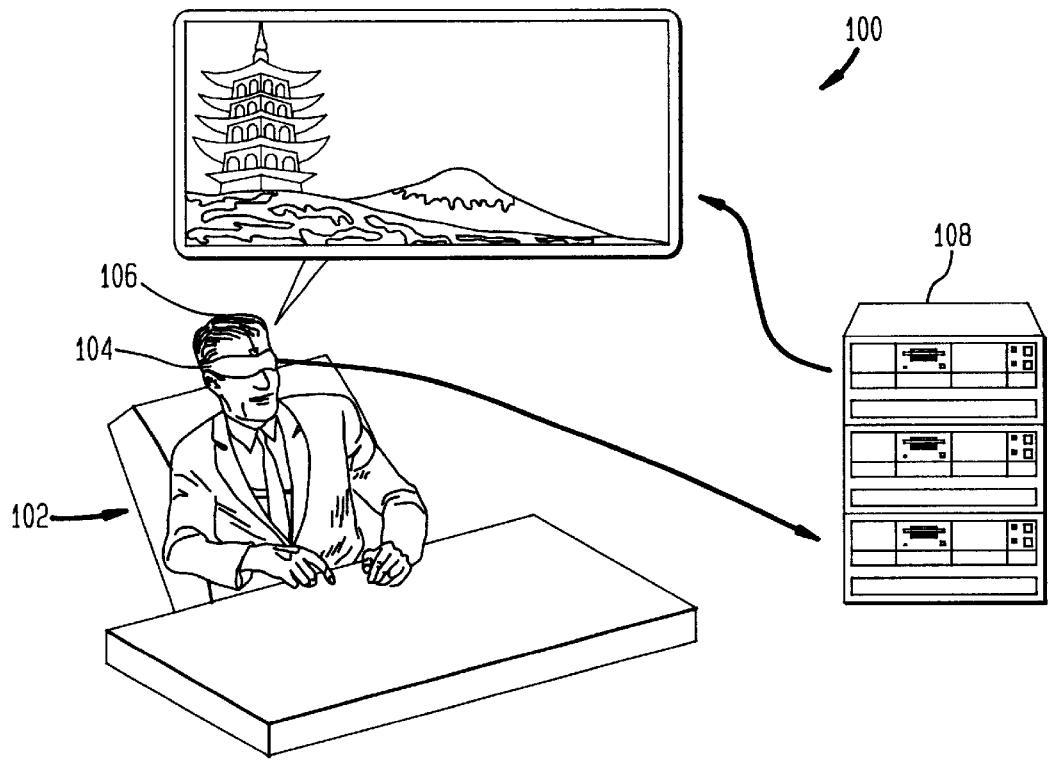
FIG. 1 illustrates a prior art virtual reality system.
Figure 2:
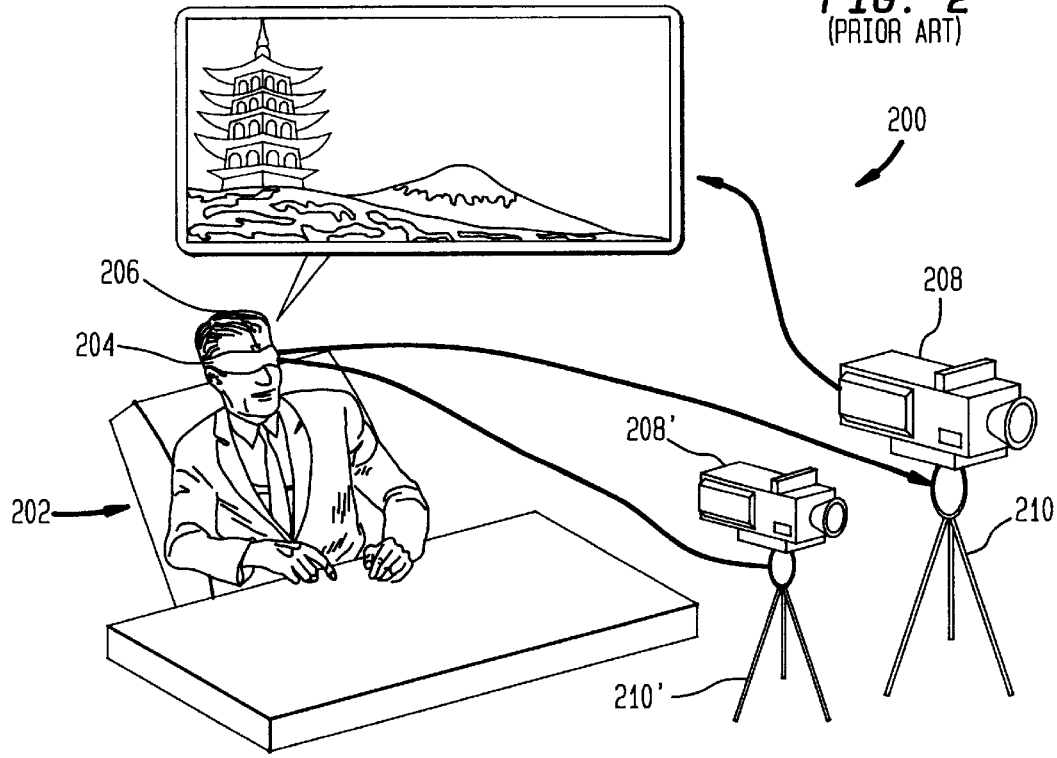
FIG. 2 illustrates a prior art full look-around telepresence system.
Figure 3:
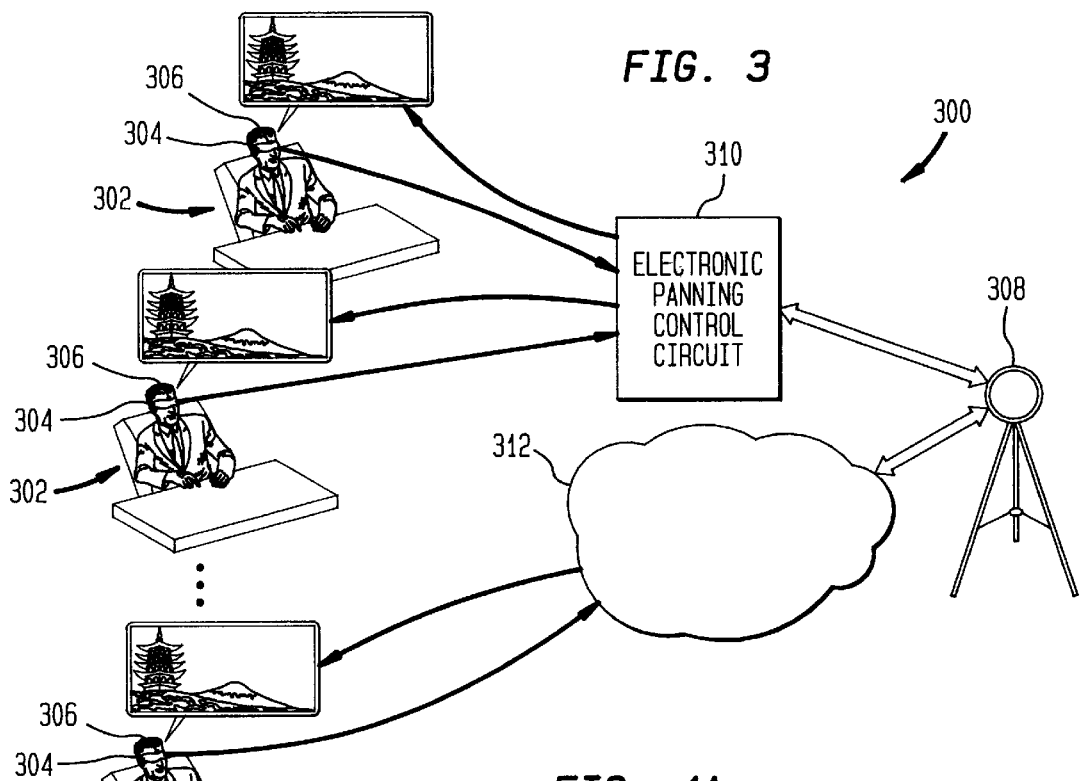
FIG. 3 illustrates a multiple user full look-around telepresence system according to a preferred embodiment of the present invention.

An overview of the invention is provided with reference to FIG. 3.

I. Structure and Operation of a Preferred Embodiment

Structure and operation of a preferred embodiment including a description of surround viewing provided by an electronic panning camera, stereo-panning, electronic panning control, and a network configuration are described with reference to FIGS. 4A–8.

II. Applications for the Present Invention

Applications of the present invention, including remote entertainment, remote education, telemedicine, and televisitation, are described.

III. Conclusion

A conclusion is provided.

IV. Overview of the Invention

FIG. 3 illustrates a preferred system according to the present invention. A number of users 302 each have a display 304, preferably a head-mounted display, and a view selector 306, preferably a head-tracking system (but may also be joystick, mouse, or other input device). The view selector 306, such as a head-tracking system, selects a desired view from the panning camera 308. If an electronic panning camera is used, each view selection is provided to an electronic panning control circuit 310, which provides a portion of a total electronic panning camera panoramic view to that user's HMD 304. The electronic panning control circuit 310 may be connected to the camera 308 to receive video information and to provide control information, such as sync information to the camera 308. The user may be connected to the electronic panning camera via a communications network 312, such as a wide bandwidth network or a video bandwidth network such as an SDV, ADSL, or HFC network, which network may include the electronic panning control circuits 310.

An electronic panning camera may provide a stereo view by configuring two cameras slightly optically horizontally offset from each other to provide a left and a right eye view. This "stereo" view provides a depth-of-field effect simulating actual vision. This "stereo" view may be further enhanced by simulating a convergence of a user's gaze as objects appear closer to the user.

The inventive system provides a superior telepresence which allows one or more viewers to each independently view the desired angle of a video image. This video image may be a real-time video image of a scene.

Structure and Operation of a Preferred Embodiment

The structure and operation of the present invention are described in the following sections. First, a description of the surround view provided by an electronic panning camera is described. Second, a method and apparatus for providing a stereo view from an electronic panning camera is described. Third, the electronic camera control, such as the panning electronics circuit 310, is described. Fourth, a network configuration for providing the present invention over a communications network, such as the network 312 of FIG. 3 is described.

Surround Viewing Provided by the Electronic Panning Camera

Although a person skilled in the art readily appreciates that the present invention may be provided with any panning camera, a preferred embodiment of the present invention includes full look-around capability provided by an electronic panning camera, such as described in U.S. Pat. Nos. 5,178,571 (the "'571 patent") and 5,537,737 (the "'737 patent"). Thus, a brief review of that technology is provided.

Figure 4A:
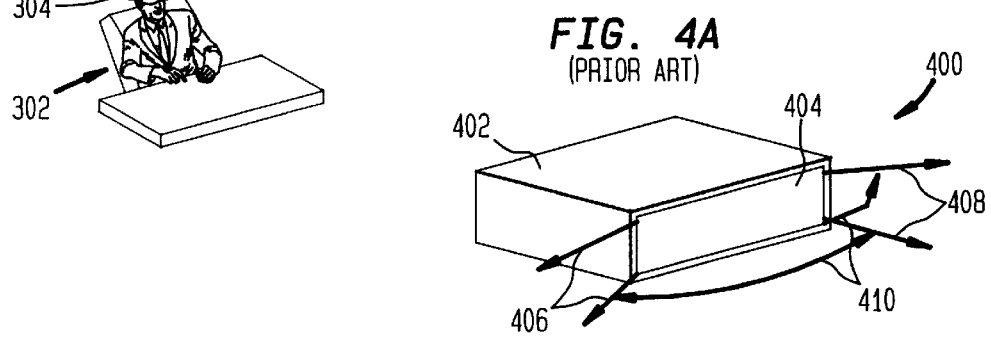
FIG. 4A illustrates an electronic panning camera as may be used in a preferred embodiment of the present invention.

As seen in FIG. 4A, a preferred electronic panning camera 400 for use with the present invention includes a panoramic camera-head 402 and associated circuitry which derives individually, electronically-pannable sub-views. The camera-head 402 is comprised of a number of small, but otherwise standard, video cameras (not shown), such as NTSC cameras or digital video cameras, and a novel mirror-merging system (not shown) which allows each individual camera view to be optically and seamlessly merged so that the cameras produce a single composite panoramic view. The camera and mirror arrangement view a scene through a first opening 404. The field of view is illustrated by the arrows 406, 408, 410.

Figure 4B:
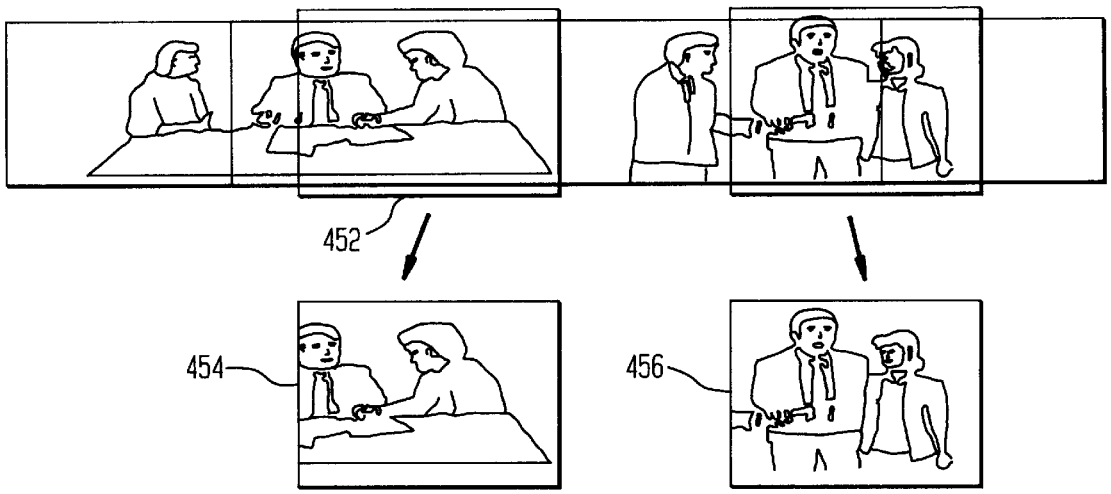
FIG. 4B illustrates electronic panning camera view extraction.

As seen in FIG. 4B, the panoramic view 450 is preferably many times the width of a standard video camera's viewing angle. For example, if five cameras are used, the composite panoramic view is five times that of a standard video camera. Thus, the resultant video signal may contain five times the information of a standard video signal.

The video views (seen in FIG. 4B) from each of the separate (and now optically merged) cameras are applied to a central controller which then electronically "seams" the views to create a contiguous panorama 450. The central controller, in turn, transmits its seamed signal to a virtually unlimited number of user-controlled panning circuits. Each of these panning circuits provides a separate, electronically pannable view. That is, each user performs the electronic equivalent of smoothly sliding a viewing "window" 452 through the panoramic view to extract the portion of the view in which the user is interested 454, 456, as shown in FIG. 4B. This panned view may take the form of a standard NTSC signal, MPEG signal, or other video signal.

Stereo-panning

An important aspect of human vision is the ability to perceive depth. This is achieved primarily through use of stereo-vision. Our eyes receive views of the world through slightly translated vantage-points, and depth information is synthesized based on the disparity in the incoming images. Although a single panning camera can produce an unlimited number of views, all of the views from a single panning camera are from the same vantage point and are not offset. A preferred embodiment of the present invention provides a pair of cameras which provide views from two horizontally offset vantage points.

To achieve a multiple-user, stereo look-around capability, two panning cameras are provided. One camera provides a left eye view and one camera provides a right eye view. These cameras are preferably optically horizontally offset by a distance on the order of a typical human interocular distance. (The actual location of the two cameras with respect to each other is unimportant, provided each camera receives the same view, except that one view is horizontally offset with respect to the other view.) A typical interocular distance for a human is 6 cm. Thus, a preferred embodiment provides two cameras optically horizontally offset by a distance on the order of 6 cm. Current electronic panning cameras have a width much greater than 6 cm. Thus, if such cameras are simply placed side-by-side, this large horizontal offset may cause an exaggerated stereo depth effect and an unrealistic viewing experience and thus is not preferable. In order to avoid this, the structure such as that shown in FIG. 5 is provided.

Figure 5:
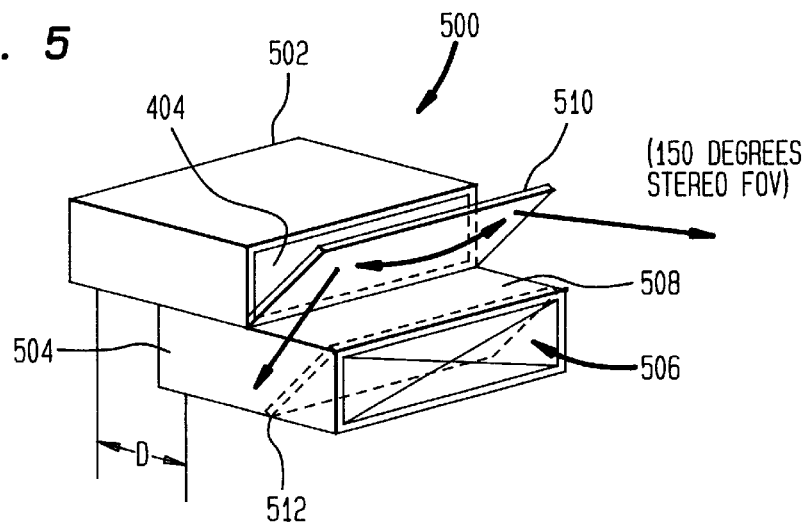
FIG. 5 illustrates an electronic panning camera which provides stereo panning according to a preferred embodiment of the present invention.

FIG. 5 is a perspective view of a preferred embodiment of a stereo panning camera 500 such as may be used with the present invention. An electronic panning camera as seen in FIG. 4A has a primary view through the front of the housing as shown, and preferably also has a parasitic view that can be imaged by the camera. This parasitic view is provided by, for example, the mirror merging system described in the '737 patent and is due to an internal image splitter such as a half-silvered mirror used to achieve the merging of the separate cameras which (in this illustrative embodiment) are vertically offset from one another. This mirror image of the primary view is normally (and intentionally) blocked by the roof of the camera housing so that light received via this path does not interfere with the view through the primary path.

As seen in FIG. 5, a preferred embodiment of the stereo panning camera comprises first and second electronic panning cameras 502, 504. The two cameras are configured to receive the same image, except that one image is horizontally offset with respect to the other image. In this illustrative embodiment, this arrangement is achieved by mounting the second camera 504 underneath the first camera 502 and slightly forward of the front of the first camera 502. The first and second cameras are preferably optically horizontally offset by a distance D which is preferably on the order of a typical human interocular distance. In this illustrative embodiment, the physical and optical offset distance D are equal, but a person skilled in the art readily appreciates that this need not be so.

The parasitic view described above is advantageously used herein by blocking the normal optical path at the front of the second camera 504 with a cover 506 and creating a second opening 508 in its top. A large image splitter 510, such as a half-silvered mirror or other well known optical splitter device, is disposed between the first and second openings to direct the view received at the first opening 404 to the second opening 508 as well. In this illustrative embodiment, the first opening 404 and second opening 508 are orthogonal and the image splitter 510 is placed in the first opening's optical path at a 45° angle to the vertical as shown, sending the image to both of the first opening 404 and the second opening 508, thus allowing the second camera 504 to look "forward", rather than upward. The image being viewed at the first camera's 502 front opening 404 enters the second opening 508 and is received at the internal mirror 512 (shown in phantom) in the second camera. The second mirror 512 corrects the second camera's reversed image caused by the image splitter 510 and sends the image to the camera's 504 internal workings. The image splitter 510 also passes the view to the first camera 502 (without reversal). The first and second cameras are physically horizontally displaced by a distance on the order of the average interocular distance and thus so, too, are the views generated by these cameras. Because the image splitter provides substantially the same view to both cameras, the images are vertically aligned.

This arrangement provides a stereo viewing effect that simulates the stereo viewing of a typical person. This new combined stereo-panning camera may provide an unlimited number of stereo pannable images.

Electronic Panning Control

The new composite camera 500 seen in FIG. 5 should preferably be controlled so that the views from the two pannable cameras remain substantially aligned and parallel throughout their angles of view for each independent user. Using, for example, the digital controls described in the '571 patent, each electronic panning control circuit will extract aligned views, provided that both cameras are given the same electronic panning control digital angle control signals. As described in detail below, it may be preferable that the left and right views be slightly unaligned when viewing objects appearing close to the camera. (Note that a non-stereo electronic panning camera may be controlled in the manner described in the '571 patent.)

In addition to the multi-user capability enabled by an electronic panning camera, the electronic panning camera has another advantage. Conventional teleoperation systems using conventional physically moving tilting and panning cameras must be pivoted quickly to match the movement of the viewer's head. In a non-electronic panning camera embodiment, a tilting, panning camera stand must move in response to the user's head movements. Because the human head can be moved at several hundred degrees per second, this is a significant challenge to remote servo technology, especially because a lag of as little as 100 milliseconds between head-movement and the corresponding movement of the camera can cause the user uncomfortable disorientation. An electronic panning camera embodiment may respond rapidly to head movements because the camera does not physically move; rather the device needs only to extract the desired portion of the panoramic view, as seen in FIG. 4B.

Figure 6:
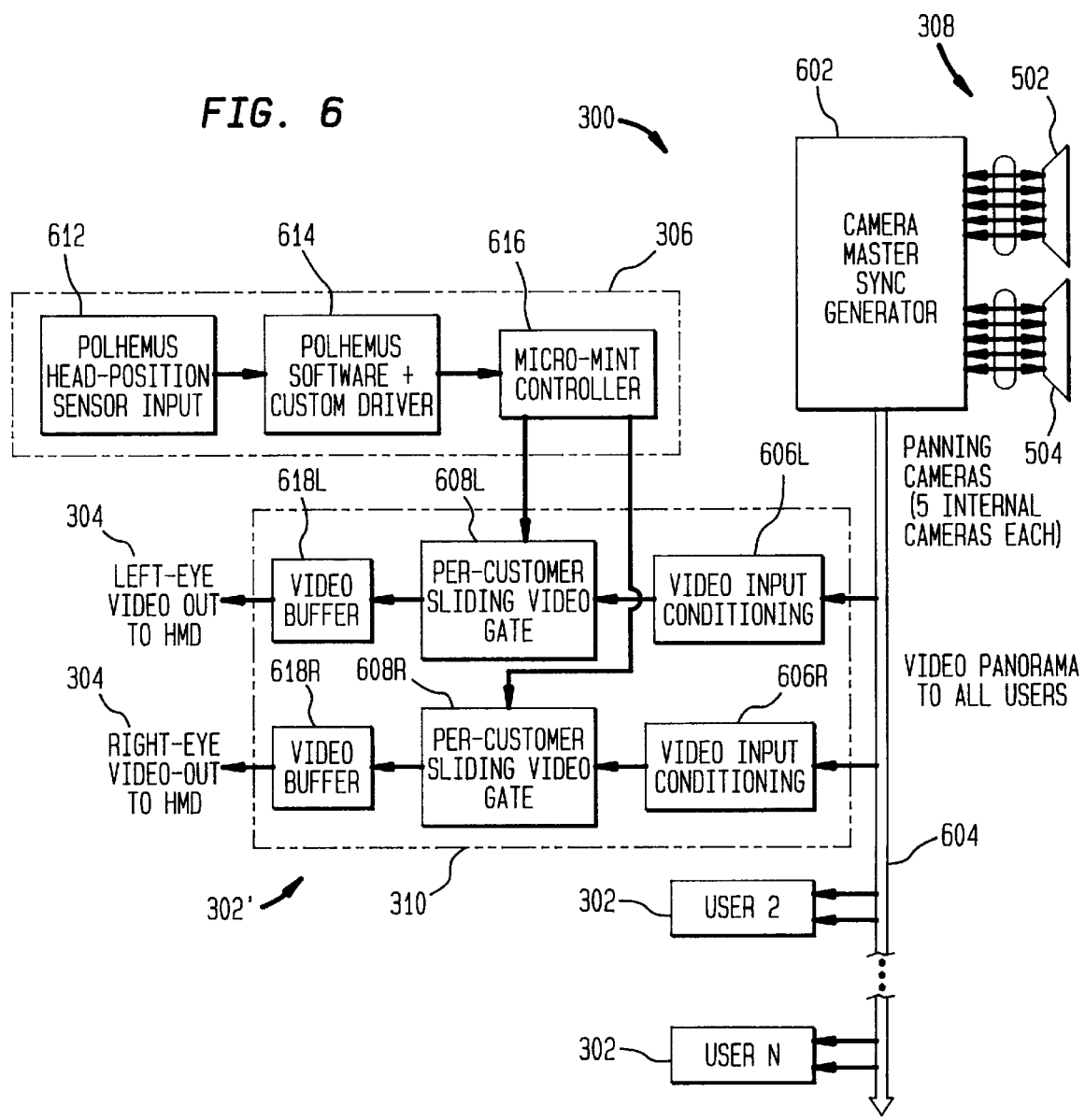
FIG. 6 is a block diagram of a preferred embodiment of the system according to the present invention.

FIG. 6 is a block diagram of a preferred embodiment of the system 300 seen in FIG. 3. The camera 308 is a stereo electronic panning camera having cameras 502, 504 (each having, in this embodiment, five internal cameras). The cameras output video images to a master sync generator 602. The master sync generator preferably provides synchronizing signals to the cameras. The master sync generator 602 may be, for example, the master sync generator described in the '571 patent. The synchronized outputs of the cameras 502, 504 are output onto a video panorama bus 604 which may provide separate left and right video outputs to a plurality of users 302.

FIG. 6 shows N users connected to bus 604. One user's 302' apparatus and method are described in detail. Both panoramic views are provided from the bus 604 to the electronic panning circuit 310. In this preferred embodiment, the panoramic views provided to the electronic panning circuit 310 are first sent to conventional video input conditioning circuits 606L, 606R, such as high impedance buffering taps. The conditioned video panoramic views are then provided to individual custom control sliding video gates 608L, 608R. These sliding, video gates are responsive to a user's view selector 306, such as a head-tracker device. A person skilled in the art readily appreciates that a joystick, mouse, or other input device may also provide a suitable view selector 306.

In a preferred embodiment, the head-tracker device comprises a head-position sensor 612 which outputs head-direction information to a processor 614, such as a computer processor, which processes the information from the head-position sensor 612. The processor 614 may control a microcontroller 616 which outputs a signal to the sliding video gates 608L, 608R, to indicate which portions of the left and right panoramic views are selected in response to the user's head-mounted display.

In a preferred embodiment, the head tracker device may be a "3-Space Tracker" available from Polhemus, Inc. The 3-Space Tracker uses a stationary reference magnetic field generator. A smaller replica of the stationary reference unit is affixed to the HMD and is used to sense the X, Y, and Z translation of the HMD as well as the azimuth, elevation, and roll angular position of the display with respect to the stationary reference device. The processor 614 may be, for example, an IBM-compatible computer running Polhemus, Inc. software and having a driver used with the Polhemus 3-Space Tracker device. The microcontroller 616 may be, for example, a "MicroMint" controller available from MicroMint Inc.

The selected portions of the panoramic view are sent to video buffers 618L, 618R which may, for example, provide video line level outputs, and are then output to the head-mounted displays 304. The head-mounted displays may be any conventional head-mounted display, such as the head-mounted displays available from Kaiser Electro-Optics. The Kaiser Electro-Optics device has a stereo display capability and 320×240 pixel video for each eye. The display optics provide a 30° field of view. Alternatively, the head-mounted displays may be those described in U.S. Pat. No. 5,883,606 entitled "Flat Virtual Displays for Telepresence and Virtual Reality" and described above.

In a preferred embodiment of the present invention, the microcontroller 616 is configured to further simulate the operation of human eyes. When a human is focusing on an object located a long distance away, the eyes gaze out in substantially parallel lines. As the eyes focus on objects located closer to the viewer, the gaze of the eyes converges slightly (i.e., the eyes "cross" slightly). The closer the object, the more the gaze converges. The microcontroller may be configured to mimic this convergence.

Figure 7A:
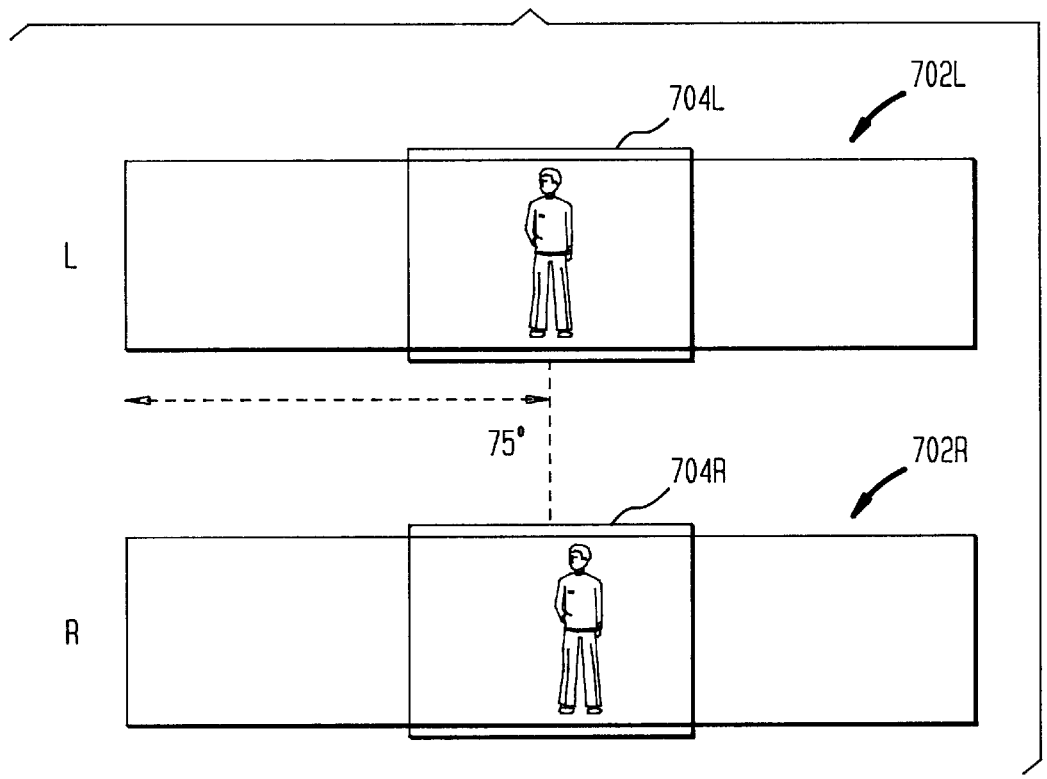
FIGS. 7A and 7B illustrate an improvement to the stereo panning camera according to a preferred embodiment of the present invention.
Figure 7B:
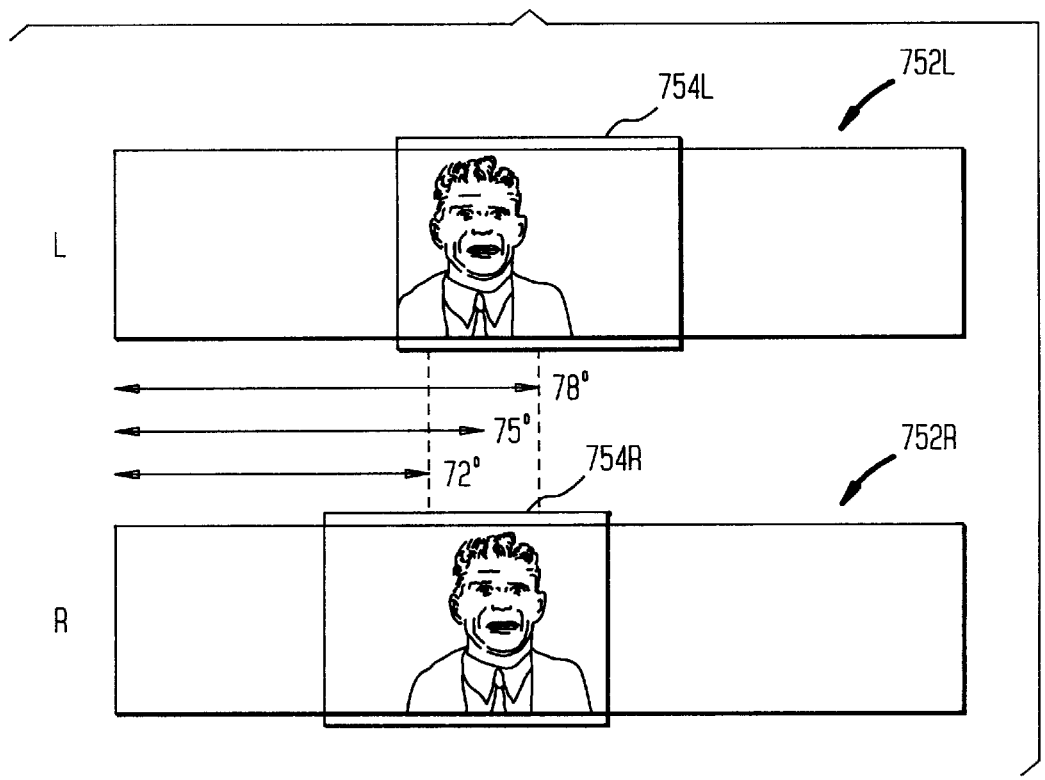

FIGS. 7A and 7B illustrate the preferred operation of microcontroller 616. As seen in FIG. 7A, desired portions of panoramic views 702L, 702R from cameras 502, 504 of an object located far from the cameras may be selected in the following manner. For this far away object, a human's eyes gaze substantially parallel to each other. Thus, the microcontroller 616 simulates this by selecting portions 704L, 704R of the panoramic view 702L, 702R which are parallel. Thus, the microcontroller 616 may extract views from the panoramic views located at the same angle. For example, in an electronic panning camera having a 150° field-of-view, a particular user may select to extract a portion of the panoramic view centered at 75°. Here, the microcontroller 616 selects both views centered at 75°. Note, however, that these views will not be identical because the cameras 502, 504 are horizontally offset by a distance on the order of a human interocular distance.

As seen in FIG. 7B, for an object appearing closer to the camera, a user may choose to provide an offset which mimics the human eyes. For this close object, a human's eyes gaze converges slightly. Thus, the microcontroller 616 simulates this by selecting portions 754L, 754R of the panoramic view that are slightly convergent. Thus, for panoramic views 752L, 752R of the close object which is centered at 75°, the left eye sliding video gate 608L may extract a video "window" 754L centered at a convergent angle, such as 78°, and the right eye sliding video gate 608R may extract video "window" 754R centered at a convergent angle, such as 72°. This provides a stereo depth-of-field effect that greatly simulates human sight.

D. Network Configuration

Electronic panning signals can be delivered in a manner that is synergistic with a PSTN (Public Switched Telephone Network), ISDN (Integrated Signaling Digital Network), or other communications network as augmented by SDV, HFC, or ADSL or other broadband and wideband network overlays.

A suitable communications network should provide large bandwidths in the inter-office trunking network and at least moderate (video-capable) bandwidths to subscriber's homes and offices. This may be coupled with relatively low upstream (e.g., from the network to the subscriber) subscriber-dedicated bandwidths.

Figure 8:
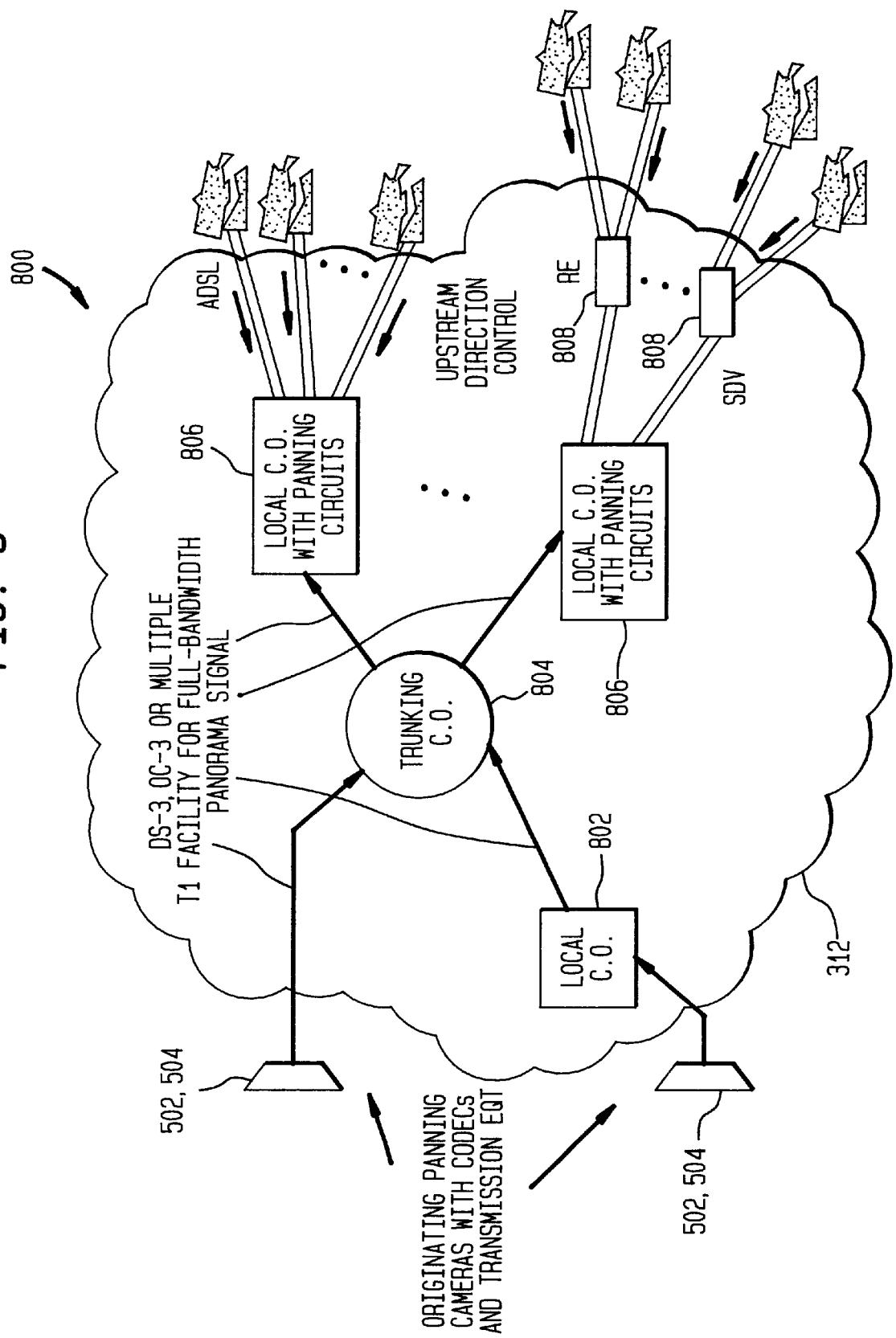
FIG. 8 illustrates a network configuration for a system according to the present invention.

FIG. 8 illustrates a communications network 800 providing electronic panning camera signals to users with HMDs via a network 312 as seen in FIG. 3. As shown in FIG. 8, the cameras 502, 504 generating stereo electronic panning video signals preferably include codecs and transmission equipment and may need wide upstream bandwidth (bandwidth in the direction leaving the camera and entering the network). This is because the panoramic view from an electronic panning camera is N-times the bandwidth of a conventional camera, where N is the number of conventional cameras comprising the composite panning camera. This bandwidth may be supplied, for example, using a fiber link to a local central office 802, such as a DS-3 (44.736 Mbps), OC-3 (155.52 Mbps), or T1 (1.544 Mbps) line.

Once at the local central office 802, the panoramic view may be sent to a trunking central office 804. From the trunking central office 804, the existing bandwidth of inter-office trunking may be used to multicast each camera's panoramic view to end central offices 806 wishing to supply the signal to subscribers. At the end central offices 806, the panoramic view video information may be applied to analog or digital distribution buses, such as bus 604 of FIG. 6. Individual subscriber line-cards may have access to electronic panning circuits in the end central office 806 or other remote electronics 808 to select desired portions of the panoramic view. Each individual user may select and process the portion of the panoramic view desired using, for example, gaze direction information obtained from the user's head-tracker device. The per-subscriber bandwidth may preferably be the equivalent of one or two (in the stereo-panning case) video feeds. Thus, the final delivery to the subscriber's home may easily be accomplished using, for instance, H.261 real-time videoconferencing-quality coding, by real-time MPEG video coding, or on an analog video channel delivered, for example, by a hybrid fiber-coax distribution network.

ADSL technology also allows the delivery of this type of signal to end users. In the case of ADSL, for instance, the upstream bandwidth nominally provided to allow control of video-on-demand channels may be used to allow the user to control gaze direction.

Applications for the Present Invention

In a networked situation as described above, one can imagine providing hundreds, thousands, or millions of users access to an event. Each user has the complete independent freedom to view the event as desired. In addition to providing stereo telepresence views, the present invention has many applications. A non-exhaustive list is provided below:

Remote Entertainment

A sporting event, theatrical performance, or newscast may be viewed using the present invention. One or more cameras may be mounted at optimum viewing locations at a remote stadium, theater, or other venue, and users, donning HMDs may view the events at a remote location and independently look around to see exactly the action of interest to the individual user without affecting other users'views.

Remote Education

A camera may be mounted in a remote classroom, with students at other schools or at home being able to attend a central lecture with the feeling that they are there. Hundreds of remote students may share the experience of being in a single classroom while actually located miles away.

Telemedicine

An application demanding the high performance capabilities of HMD-linked electronic panning cameras is telemedicine. A surgical training facility may be provided where a number of interns may view a remote operation. A single panning camera, placed above the operating table, allows remote students to freely look around at an ongoing procedure with the ability to focus their attention on the portions of the operation that most concern them (e.g., focus on the patient's overall condition, observe the actions of the anesthesiologist, concentrate on the location of the incision).

Televisitation

Electronic panning cameras may be placed at interesting scenic locations (e.g., Grand anyon, Mt. Everest, Alaskan wild lands, etc.). Users could enjoy the experience of "being" at these locations by donning light-weight HMDs.

Conclusion

Described is a system which provides one or more users the ability to "look around" at a remote site as though physically there. To achieve this capability, a novel remote telepresence is described. The system preferably includes a stereo panning camera, such as an electronic panning camera, connected with head-mounted video viewing technology borrowed from the field of virtual reality. Because the invention is preferably based upon the multi-user electronic panning camera system, a virtually unlimited number of independent users can access the views coming from a single originating stereo camera with each of those users being free to independently "look" in any desired direction, independent of other users. Although this system is cutting edge in terms of the viewer control and the subjective quality of the experience delivered, its bandwidth requirements can be met by the capabilities of SDV, ADSL, and hybrid fiber-coaxial systems.

The above described embodiments of the invention are intended to be illustrative only. Numerous alternative embodiments may be devised by those skilled in the art without departing from the spirit and scope of the following claims.

We claim:

1. A system for providing a plurality of users with individual pannable stereoscopic views of a video imaged scene, said system comprising:

a first electronic panning camera for receiving a first view of an image having an opening towards the image to be viewed;

a second electronic panning camera for receiving a second view of said image, said second electronic panning camera being mounted at an optically horizontal offset position with respect to said first camera and being mounted beneath and forward of said first camera having an opening at its top and in front of said opening of said first camera;

an image splitter disposed between said first camera opening and said second camera opening such that the first and second views are horizontally offset views of the same image;

an electronic panning control circuit for each user and connected to said first and second electronic panning cameras to receive the stereoscopic views therefrom, said electronic panning control circuit including means for selecting a portion of a stereoscopic view to be seen by said each user; and a head mounted display for said each user and connected to the electronic panning control circuit for said each user for displaying the selected stereoscopic view to the first and second eyes of said each user.

2. The stereoscopic electronic panning camera arrangement in accordance with claim 1 wherein said first camera opening and said second camera opening are orthogonal and said image splitter is positioned at an angle of 45° to said first camera opening and to said second camera opening.

3. The stereoscopic electronic panning camera arrangement in accordance with claim 2 wherein said image splitter is a half-silvered mirror.

4. The system in accordance with claim 1, further comprising:

a master sync generator connected to said first and said second cameras for receiving and synchronizing outputs therefrom;

said head mounted display for each user including a head-tracking system for detecting a location of a user's head and generating a gaze-direction signal;

said electronic panning control circuit for each user comprising a first sliding video gate receiving the first view from said first camera and responsive to said gaze-direction signal for selecting a portion of the stereoscopic view for the first eye and a second sliding video gate receiving the second view from said second camera and responsive to said gaze-direction signal for selecting a portion of the stereoscopic view for the second eye, the selected portions of the views from said first and said second cameras providing the user with different convergent angles.

* * * * *